Patented Aug. 2, 1949

2,477,658

UNITED STATES PATENT OFFICE 2,477,658

COPOLYMERIC VINYLIDENE CHLORIDE COMPOSITION

Hugo L. Schaefer, Midland, Mich., assignor to The Dow Chemical Company, Midland, Mich., a corporation of Delaware No Drawing. Application January 30, 1947, Serial No. 725,276

2 Claims. (Cl. 260—31.6)

This invention relates to a specific composition consisting of a particular vinylidene chloride-vinyl chloride copolymer and small amounts of certain modifying agents therefor. It relates in particular to such a composition, capable of being extruded and stretched in normal manner to produce translucent, odorless films which are not discolored by the heat of extrusion, which do not exude their contained modifying agents, have high flexibility at low temperatures, and are adapted particularly for packaging foods to be frozen.

Within the past few years the copolymers of vinylidene and vinyl chlorides have become industrially important. Some of them are unique by virtue of their now well-known crystalline character. Of these, the most important copolymers have been those which may be obtained by polymerizing, in aqueous suspension, a mixture of about 85 per cent by weight of vinylidene chloride and about 15 per cent of vinyl chloride, under conditions to yield a copolymer of about 88-94 per cent of vinylidene chloride copolymerized with about 12-6 per cent of vinyl chloride. This product may be extruded readily when properly modified, but cannot be extruded to form useful products without having present a modifying agent to serve as a plasticizer during the exposure to high temperatures in the extrusion zone, and to depress the softening point and increase the thermal stability. Without such agents, the product decomposes at elevated temperatures to such an extent as to discolor it and make the extruded article unacceptable for commercial use. The modifier should have, as well, some protective effect against the action of direct sunlight, which tends to darken the extruded article to unacceptable shades.

It has been the prior experience that very few of the common "plasticizers" can be used to assist in extrusion of the identified copolymer, and that when thin extruded articles such as films or fine filaments are to be made, the number of operative plasticizers is still smaller. With most such modifiers, the heat of extrusion results in a thermal degradation of the copolymer, evidenced by darkening and by evolution of hydrogen chloride, indicative of decomposition. The resulting products are often brittle, and are subject to further darkening when exposed to light containing ultra-violet radiations. Those few plasticizers which have been used successfully with the present copolymer, notable among which is di-(alpha-phenylethyl) ether, have exuded to the surface of the crystalline article after it has been formed by extrusion, supercooling and stretching in the manner which is now well known. Such exudation gives the article an undesirably oily surface. This is especially noticeable with multi-directionally stretched thin (0.005 inch, or less) film made from the described copolymer, as such film, due to the arrangement of the sub-microscopic crystallites, has a minimum capacity for internal modifiers. Most plasticizers used with the copolymer, which have the faculty of assisting the extrusion, have distinct and commonly disagreeable odors, and films of the present copolymer containing them usually exhibit these odors to an even more pronounced extent and cannot be used for packaging foodstuffs because of the fact that they impart foreign flavors or odors to the enclosed foods. Since the described copolymer, when in the form of a film, has the lowest moisture vapor transmission values of any commercial film (from 0.5 to 0.1 the values for the best other films), it is highly desirable to find a means for extruding the copolymer without danger of subsequent exudation and the other named prior disadvantages.

The defined range of vinylidene chloride-vinyl chloride copolymers is unique in its properties and in the problems which it presents during extrusion. Larger amount of vinyl chloride in the copolymer increase its compatibility with plasticizers and decrease its extrusion temperature, but are accompanied by increased sensitivity to organic solvents and films made therefrom are less strong and less crystalline than those here concerned. Similarly, lesser amount of vinyl chloride in the copolymer are accompanied by higher fusion temperatures, decreased flexibility in extruded articles, almost complete incompatibility with plasticizers, and relatively very limited utility.

It is accordingly among the objects of the present invention to provide a composition of matter containing the above-identified copolymer and such modifiers as may be required to extrude the same easily without thermal decomposition, which is capable of being extruded and stretched to form an oriented crystalline thin film which is at least translucent so as to make visible articles wrapped therein, and is odorless, flexible at low temperatures, and does not exude its modifiers on standing. It is an ultimate object to provide a thin oriented crystalline film of the said copolymer, which film possesses the above-stated desired properties.

It has now been found that the foregoing and related objects may be attained by the preparation of a particular composition consisting of at least 89 per cent, preferably at least 92 per cent by weight, and not to exceed 94.5 per cent of the copolymer of from 88 to 94 per cent of vinylidene chloride copolymerized with correspondingly from 12 to 6 per cent of vinyl chloride, and a complementary amount of the following modifiers, each within the stated range of proportions: (1) from 0.5 to 1 per cent of a compound selected from the class consisting of tribarium orthophosphate and tetrasodium pyrophosphate, and (2) from 5 to 10 per cent, preferably from 5 to 8 per cent of a compound selected from the class consisting of methyl and ethyl phthalyl ethyl glycolates. The so-defined composition is capable of being extruded easily and extruded articles such as fine fibers, coarser filaments, and thin films do not exude the contained modifiers and have no significant odor. Films made from the composition remain flexible at temperatures prevalent in frozen food lockers, and such films may be used not only to wrap meats, vegetables and other foods for storage at freezing temperatures, but also to wrap cheese, butter and other foods normally stored at higher temperatures, without tainting or otherwise adversely affecting the packaged goods, so far as can be determined by taste, odor and appearance of the wrapped foods.

The above-named phosphates are not plasticizers, and do not lower the flow viscosity of the copolymer. When either ethyl or methyl phthalyl ethyl glycolate is used as the sole modifier for the copolymer extrusion is nearly impossible regardless of the amount of plasticizer employed, the resulting badly discolored extruded articles exude the excess plasticizer, and have a disagreeably oily appearance and feel. When, however, the above-recommended combinations of modifiers are used, extrusion is readily obtained without decomposition, and the products do not exude their plasticizer even when they are fully stretched and oriented and have the least capacity for modifying agents.

In a specific example, a composition was prepared by mixing together in a ball mill 7 per cent by weight of methyl phthalyl ethyl glycolate, 1 per cent of barium phosphate, and 92 per cent of a copolymer of vinylidene and vinyl chlorides which was shown by analysis to contain 92 per cent of the former chloride copolymerized with 8 per cent of the latter. The composition was extruded at 175° C. as a tube 2.5 inches in diameter. The tube passed downwardly into a water bath at 10° C. to supercool it, thence between two spaced pairs of driven pinch rollers. The portion of tube between the orifice and the first set of rollers contained a column of mineral oil to a level slightly above that of the water bath. The section between the two sets of pinch rolls was inflated to provide an elongated bubble, enough air being used to expand the tube radially about four times its original extruded diameter. This stretching occurred between and removed from each of the sets of rollers. Addition of more air resulted only in elongation of the bubble and displacement of the stretching zone toward the first set of rollers, and not in a greater radial distension. The driven rollers had a peripheral speed about three times that of the idler rolls. The resulting film tube was slit in the customary manner to provide a film sheet about 31 inches wide and about 1.5 mils thick. The film was translucent and showed no signs of yellowing due to the heat of extrusion. Even on prolonged standing the film did not exude its contained modifiers, and had no noticeable or objectionable odor. Portions of the film were used to wrap freshly cut blocks of cheddar cheese, and the wrapped product was kept for several days at moderate temperatures permitting the fats in the cheese to come into contact with the film. Slices from the six exposed surfaces of the cheese had no detectable foreign flavor. By way of contrast, a similarly produced film consisting of the same copolymer and 7 per cent of its weight of di-(alpha-phenylethyl)ether had a marked surface oiliness due to exudation immediately after it was produced, a strong and disagreeable persistent odor, and would not be considered for use in contact with odor-sensitive foods. A roll of that film, on standing for a few weeks, actually dripped the exuded plasticizer.

In a similar manner, and with like results, films were prepared from a composition of 90 per cent of the same copolymer, 0.5 per cent of tetrasodium pyrophosphate and 9.5 per cent of ethyl phthalyl ethyl glycolate. All of the films of the compositions of the invention remained flexible when stored for prolonged periods at 0° F. None of them exuded plasticizer when stored for several months at room temperature.

It is to be understood that die lubricants, such as carnauba wax or magnesium stearate, may be used in the customary manner during extrusion of the present compositions. Such agents, being ed only for their effect in lubrication of the composition through the extrusion die, are not considered essential parts of the composition.

I claim:

1. A composition of matter consisting of from 89 to 94.5 per cent by weight of the copolymer of from 88 to 94 per cent of vinylidene chloride copolymerized with correspondingly from 12 to 6 per cent of vinyl chloride, and a complementary amount of the following modifiers, each within the stated range of proportions: (1) from 0.5 to 1 per cent of a compound selected from the class consisting of tribarium orthophosphate and tetrasodium pyrophosphate, and (2) from 5 to 10 per cent of a compound selected from the class consisting of methyl phthalyl ethyl glycolate and ethyl phthalyl ethyl glycolate.

2. A translucent, odorless oriented crystalline film, which is free from tendency to exude its contained modifiers, is flexible at 0° F., and is composed of the composition claimed in claim 1.

HUGO L. SCHAEFER.

REFERENCES CITED

The following references are of record in the file of this patent:

UNITED STATES PATENTS

| Number | Name | Date |
|---|---|---|
| 2,245,742 | Alexander | June 17, 1941 |
| 2,270,662 | Raney | Jan. 20, 1942 |
| 2,328,748 | Scott | Sept. 7, 1943 |
| 2,364,410 | Whittaker | Dec. 5, 1944 |